2,700,038
Patented Jan. 18, 1955

2,700,038

DIBASIC SALTS OF ADENOSINE TRIPHOSPHATE AND METHOD OF PREPARATION

Samuel H. Lipton, Milwaukee, and Samuel A. Morell, Whitefish Bay, Wis., assignors to Pabst Brewing Company, Milwaukee, Wis., a corporation of Delaware No Drawing. Application September 27, 1951,
Serial No. 248,632

13 Claims. (Cl. 260—211.5)

This invention relates to a new and useful salt of adenosine triphosphoric acid, more particularly a water soluble dibasic salt, and to a method for the preparation thereof.

As is well known in the art (P. Ostern, U. S. Patent 2,174,475; G. Henning, German Patents 703,400, 708,624) the addition of adenosine and inorganic phosphate to a yeast fermentation system results in the enzymatic synthesis of adenosine-5'-phosphate (AMP, or muscle adenylic acid) and the corresponding polyphosphates, viz., the diphosphate and the triphosphate. The polyphosphates are very labile compounds, particularly in alkaline solution, and tend to become hydrolyzed, during their isolation, to the more stable AMP.

Methods heretofore employed for obtaining adenosine triphosphoric acid, either from a filtered fermentation mixture or from a muscle or other tissue extract, have involved the following essential steps: (1) precipitation of a water insoluble salt of adenosine triphosphoric acid, such as that of barium, mercury, lead, silver and copper, usually from alkaline solutions where such salts exhibit lowered solubility; (2) double decomposition of these salts with acids to form inorganic salts which are insoluble in the acids employed for the decomposition, such as barium sulfate, lead sulfide, mercuric sulfide and silver chloride, thus liberating the free adenosine triphosphoric acid in solution; and (3) either directly precipitating the free acid with water miscible organic solvents, or first neutralizing to a salt, such as tetrasodium or tetrapotassium adenosine triphosphate, and then precipitating with a water miscible organic solvent.

One of the objects of the present invention is to prepare a new and useful salt of adenosine triphosphoric acid which is stable, readily soluble in water and can be used directly in chemical enzymatic, clinical and other applications.

Another object of the invention is to prepare a compound of the type described by a process which is simpler, more direct and less expensive than processes heretofore employed to prepare adenosine triphosphoric acid and its neutral salts. Other objects will appear hereinafter.

In accordance with this invention, we have discovered that in the presence of a sufficient concentration of alkali metal ions in an aqueous solution containing adenosine triphosphoric acid, even in a strongly acidified solution, a dibasic salt of said acid is precipitated by a water miscible organic solvent. It is hence unnecessary, in fact detrimental to both purity and yield, to conduct the laborious steps of heavy metal precipitation, decomposition, and reprecipitation heretofore employed in the art.

As may be seen from its formula

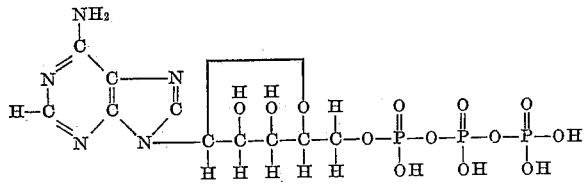

adenosine triphosphoric acid is a strong acid which contains four titratable hydrogen ions. In the dibasic salt, two of these ions are replaced by alkali metal ions. From elecrometric titration data, it might be expected that on adjusting an adenosine triphosphoric acid solution to various pH levels with an alkali hydroxide, and precipitating with alcohol, the salts which separate would correspond to the pH-composition titration curves. To our suprise, this has not been found to be the case, the dibasic salts being precipitated from strongly acidified solutions. This may be illustrated as follows: On adding either sodium, potassium or lithium chloride to an acidified aqueous solution of the free adenosine triphosphoric acid which is free of cations other than hydrogen ion, and then adding an alcohol such as ethanol, methanol or propanol, the diabasic salts separate and are found to be free of chloride ion. For example, a 5% solution of adenosine triphosphoric acid was adjusted to pH 1.0 by adding hydrochloric acids, then sodium chloride was added to 1% concentration and the solution was poured into 4 volumes of ethanol. After filtering, washing with ethanol and drying, the product was found to be disodium dihydrogen adenosine triphosphate of high purity and free of chloride ion.

In our process for preparing a dibasic salt of adenosine triphosphoric acid from yeast fermentation mixtures, we prefer to isolate the product in two stages, a less pure and a highly purified form. In both stages of this process, advantage is taken of our discovery that a dibasic adenosine triphosphate may be precipitated from strong acid solutions as described above. The fermentation medium in which adenosine triphosphoric acid is formed from adenosine contains large amounts of inorganic phosphate. One great advantage of our isolation process is the fact that dibasic adenosine triphosphate obtained directly from the complex fermentation mixture is substantially free of inorganic phosphate and is 80% to 90% pure.

Although the dibasic adenosine triphosphate obtained directly from the fermentation mixture is sufficiently pure for various chemical, biochemical and other purposes, it contains certain impurities, such as calcium, magnesium, etc., which are inhibitory to some delicate enzymatic systems in which it may be employed. These impurities are easily removed by well known ion exchange procedures. Thus, the dibasic adenosine triphosphate is dissolved in water, passed through an ion exchange resin and again precipitated from a strong acid solution by adding a salt (e. g., NaCl, KCl or LiCl) and a water miscible organic solvent. The purity of the dibasic salt so obtained is 85% to 100%, depending upon the particular ion-exchange process employed. The dibasic adenosine triphosphates are stable when stored at 0° C., readily soluble in water, and after pH adjustment to any desired range, can be used directly in various chemical, enzymatic, clinical, or other applications.

As an illustrative embodiment of the manner in which the invention may be practiced, the following examples are presented:

Example I

Ten (10) grams of adenosine are dissolved in a liter of 0.1 molar sodium orthophosphate buffer of pH 7. After the addition of 250 grams of fresh brewer's yeast and 5 ml. of toluene, the mixture is stirred for 2 hours at 25° C. Small samples are then removed every 15 minutes for inorganic phosphate analysis. As soon as maximum uptake of inorganic phosphate has occurred, which usually requires 2 to 5 hours, the reaction is interrupted by cooling to 0° C. and adding 50 ml. of 70% perchloric acid. After filtering, and washing the filter cake with water, the solution is poured into 4 volumes of 95% ethanol. The precipitate is filtered, washed with ethanol and dried. It is disodium dihydrogen adenosine triphosphate, Na₂H₂ATP.4H₂O, of 80% to 90% purity.

Example II

Ten (10) grams of disodium dihydrogen adenosine triphosphate, prepared as described in Example I, are dissolved in 200 ml. of water, passed through a 1 inch by 20 inch bed of cation exchange resin which is in the hydrogen form, and the column then washed with 100 ml. of water. To the effluent, which is now free of all inorganic cations except hydrogen ion, is added 4 grams of sodium chloride and 10 ml. of constant boiling hydrochloric acid. After adding 4 volumes of 95% ethanol, filtering, washing and drying, 9 grams of disodium hydrogen adenosine triphosphate, $Na_2H_2ATP \cdot 4H_2O$, are obtained, of which the following is a typical analysis:

|  | Observed | Theory |
|---|---|---|
| Adenine by E-260, micromols per mg | 1.54 | 1.60 |
| Molar Ratio, Adenine:Labile P:Organic P | 1:2.00:3.02 | 1:2:3 |
| Inorganic Phosphate, micromols per mg | 0.04 | 0 |
| Neutralization Equivalent, micromols alkali per mg | 3.27 | 3.21 |
| Percent ATP by Electrophoretic Assay | 89.3 | 100.0 |
| Percent ATP by Resin Assay (J. Am. Chem. Soc., 72, 4273 (1950)) | 86.5 | 100.0 |

*Example III*

Ten (10) grams of disodium dihydrogen adenosine triphosphate are passed through a cation exchange column exactly as described in Example II. Instead of adding 4 grams of sodium chloride to the effluent, however, 4 grams of potassium chloride are added. The product is dipotassium dihydrogen adenosine triphosphate.

*Example IV*

Ten (10) grams of disodium dihydrogen adenosine triphosphate, prepared as described in Example I, are dissolved in water and selectively adsorbed and eluted from an anion exchange resin by the method described by Cohn and Carter (J. Am. Chem. Soc. 72, 4273 (1950)). To the effluent, hydrochloric acid and sodium chloride are added until the concentrations are 1.0% and 1.3%, respectively, and the solution is mixed with 4 volumes of 95% ethanol. The yield is 7 grams of disodium dihydrogen adenosine triphosphate, $Na_2H_2ATP \cdot 4H_2O$, of 95% to 100% purity, of which the following is a typical analysis:

|  | Observed | Theory |
|---|---|---|
| Adenine by E-260, micromols per mg | 1.58 | 1.60 |
| Molar Ratio, Adenine:Labile P:Organic P | 1:1.99:3.01 | 1:2:3 |
| Inorganic Phosphate, Micromols per mg | 0.03 | 0 |
| Neutralization Equivalent, micromols alkali per mg | 3.13 | 3.21 |
| Percent Sodium | 7.40 | 7.38 |
| Percent ATP by Electrophoresis Assay | 99.4 | 100.0 |
| Percent ATP by Resin Assay (J. Am. Chem. Soc. 72, 4273 (1950)) | 94.4 | 100.0 |

*Example V*

Ten (10) grams of disodium dihydrogen adenosine triphosphate are dissolved in water and selectively adsorbed and eluted from an anion exchange resin as described in Example IV. Instead of adjusting the eluted solution to 1.3% in sodium chloride concentration, however, it is adjusted to 1.3% in potassium chloride and the product is dipotassium dihydrogen adenosine triphosphate of 95% to 100% purity.

*Example VI*

The procedure of Example II is followed except that chemically equivalent proportions of lithium chloride are substituted for the sodium chloride. The product is the dilithium dihydrogen adenosine triphosphate.

*Example VII*

The procedure of Example IV is followed except that the sodium chloride is replaced by chemically equivalent proportions of lithium chloride. The product is dilithium dihydrogen adenosine triphosphate.

In a similar manner, other water soluble salts are used in chemically equivalent proportions. Instead of sodium chloride, potassium chloride or lithium chloride, the water soluble lithium, sodium or potassium bromides, mono- and di-orthophosphates, pyrophosphates, polymetaphosphates, tripolyphosphates, tetraphosphates, sulfates, acetates, nitrates, and formates are employed.

Instead of ethanol, other water miscible organic solvents are used, for example, methanol, propanol, acetone, methyl ketone, diethyl ketone, diethyl ether, dioxane, ethylene glycol, diethylene-glycol, glycol ethyl ether, glycol methyl ether, glycol butyl ether, diethylene glycol ethyl ether, ethyl lactate and other alcohols, ketones, glycols and esters which are miscible with water.

The strong acid employed to obtain the desired low pH is preferably hydrochloric, chloric, perchloric, trichloroacetic, sulfuric or nitric.

In making the dibasic salts of adenosine triphosphoric acid by yeast fermentation procedures the preferred steps in the practice of the present invention are (a) buffering the reaction mixture of adenosine and yeast in the pH range of 6 to 7 with primary and secondary phosphates of monovalent alkali metals, (b) cooling to 0° C. to 5° C. after the formation of adenosine triphosphate has reached substantially a maximum level, (c) adding a strong acid (e. g., any of the acids previously mentioned) in an amount sufficient to effect dealbuminization, preferably to a pH of 1 or less, (d) filtering, (e) adding a water miscible organic solvent to the filtrate to precipitate the dibasic salt of adenosine triphosphoric acid of 80% to 90% purity.

If a very pure product is desired, the purification is preferably effected by passing solutions of the dibasic adenosine phosphate through ion exchange bodies (either cationic or anionic or both) capable of removing all inorganic ions except hydrogen, and then adding a salt of an alkali metal, a strong acid and a water miscible organic solvent.

The concentrations of the salt which is added to the adenosine triphosphoric acid, or is present in a reaction mixture containing said acid, are subject to variation. The minimum amount is that amount theoretically required to replace two hydrogen atoms of the —OH groups attached to the phosphorus atoms of the adenosine triphosphoric acid. Concentrations of salt, calculated as sodium chloride, in excess of about 1%, preferably around 1.3% by weight, have given very good results.

The particular order of bringing together the alkali metal ions, the adenosine triphosphoric acid and the water miscible organic solvent is immaterial but it is usually preferable to add the water miscible organic solvent last. The aqueous solution of the adenosine triphosphate may be added to the solvent or vice versa. The optimum volume concentration of the solvent can be determined by routine experiment but normally it is desirable to use several times the volume of the adenosine triphosphate solution.

This method of precipitating an adenosine triphosphate has several advantages over methods heretofore employed. Whereas the addition of alcohol to an aqueous solution of the free acid, adenosine triphosphoric acid, results in an incomplete separation of an oily product, the presence of alkali salts permits a practically quantitative precipitation of granular dibasic salts of adenosine triphosphoric acid which are readily separated by decantation.

The invention is hereby claimed as follows:

1. A dibasic salt of adenosine triphosphoric acid wherein two of the hydrogen atoms of —OH groups attached to the phosphorus atoms of said acid are replaced by monovalent alkali metal atoms.

2. Disodium dihydrogen adenosine triphosphate.

3. Dipotassium dihydrogen adenosine triphosphate.

4. Dilithium dihydrogen adenosine triphosphate.

5. A method of preparing an adenosine triphosphate which comprises bringing together in a strongly acid solution a water soluble salt of an alkali metal, a water miscible organic solvent and an aqueous solution of adenosine triphosphoric acid, to precipitate a dibasic alkali metal salt of adenosine triphosphoric acid.

6. A method of preparing an adenosine triphosphate which comprises bringing together in a solution having a pH of about 1 a water soluble salt of an alkali metal, a water miscible organic solvent and an aqueous solution of adenosine triphosphoric acid, to precipitate a dibasic alkali metal salt of adenosine triphosphoric acid.

7. A method of preparing an adenosine triphosphate which comprises adding a strong acid to an aqueous solution of an adenosine triphosphate containing alkali metal ions to provide a strongly acid solution, and then adding a water miscible organic solvent effective to precipitate a dibasic alkali metal salt of adenosine triphosphoric acid.

8. A process of preparing an adenosine triphosphate which comprises buffering a fermentation mixture containing adenosine, water and yeast with primary and secondary inorganic phosphates of an alkali metal in the pH range of 6 to 7, fermenting until the uptake of inorganic phosphates has reached substantially a maximum, cooling to 0° C. to 5° C., adding a strong acid in amounts sufficient to effect dealbuminization of the resultant mixture and to provide a strongly acid solution, filtering and adding a sufficient amount of a water miscible organic solvent to precipitate a dibasic alkali metal salt of adenosine triphosphoric acid.

9. A process of preparing an adenosine triphosphate which comprises buffering a fermentation mixture containing adenosine, water and yeast with primary and secondary inorganic phosphates of an alkali metal in the pH range of 6 to 7, fermenting until the uptake of inorganic phosphates has reached substantially a maximum, cooling to 0° C. to 5° C., adding a strong acid from the group consisting of hydrochloric, chloric, perchloric, trichloroacetic, sulfuric and nitric in amounts sufficient to effect dealbuminization of the resultant mixture and to provide a solution having a pH of at most about 1, filtering and adding a sufficient amount of a water miscible organic solvent to precipitate a dibasic alkali metal salt of adenosine triphosphoric acid.

10. A process as claimed in claim 8 wherein the resultant precipitate is dissolved in water, the resultant aqueous solution is brought into contact with an ion exchange material capable of removing inorganic ions other than hydrogen, and a water soluble alkali metal salt, a strong acid and a water miscible organic solvent are added to the effluent from said ion exchange material, to provide a strongly acid solution and to precipitate a dibasic alkali metal salt of adenosine triphosphoric acid having a high degree of purity.

11. A method of preparing an adenosine triphosphate which comprises adding sodium chloride to an aqueous solution of adenosine triphosphoric acid and providing a low pH around pH 1 in the resulting solution, the concentration of sodium chloride being in excess of 1% by weight of said solution, and mixing the resultant product with ethanol sufficient to precipitate disodium dihydrogen adenosine triphosphate.

12. A dibasic salt of adenosine triphosphoric acid wherein two of the hydrogen atoms of —OH groups attached to the phosphorus atoms of said acid are replaced by monovalent alkali metal atoms, said salt being in solid form and at least about 80% pure.

13. A dibasic salt of adenosine triphosphoric acid wherein two of the hydrogen atoms of —OH groups attached to the phosphorus atoms of said acid are replaced by monovalent alkali metal atoms, said salt being in solid form and about 95% to 100% pure.

References Cited in the file of this patent

UNITED STATES PATENTS

| 1,978,881 | Lautenschlager et al. | Oct. 30, 1934 |
| 2,174,475 | Ostern | Sept. 26, 1939 |
| 2,606,899 | Smythe et al. | Aug. 12, 1952 |

OTHER REFERENCES

Merck Index, Merck & Co., Inc., 1952, page 21.